United States Patent
Ando et al.

[11] 3,923,773
[45] Dec. 2, 1975

[54] METHOD FOR PREPARING ISOINDOLENONE PIGMENTS

[75] Inventors: Hirohito Ando, Urawa; Kunihiko Takagi, Tokyo, both of Japan

[73] Assignee: Dainippon Ink & Chemicals, Inc., Tokyo, Japan

[22] Filed: Apr. 25, 1973

[21] Appl. No.: 354,194

[52] U.S. Cl............ 260/152; 260/295 K; 260/165; 260/305; 260/325; 260/558 P; 106/288 Q
[51] Int. Cl.[2]............C07D 209/50; C09B 57/00; C07C 103/76
[58] Field of Search.......... 260/305, 325 PH, 295 K, 260/1, 165, 152

[56] References Cited
UNITED STATES PATENTS
3,496,190  2/1970  Von der Crone................ 260/325

*Primary Examiner*—Donald G. Daus
*Assistant Examiner*—Diana G. Rivers
*Attorney, Agent, or Firm*—Sherman & Shalloway

[57] ABSTRACT

A method of preparing an isoindolenone pigment represented by the general formula

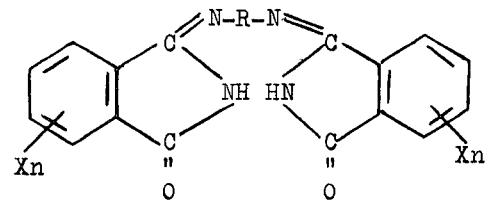

wherein X is a halogen atom, $n$ is 0 or an integer of 1 – 4, and R is a direct bond, divalent aromatic residue or divalent heterocyclic residue, wherein a compound represented by the general formula

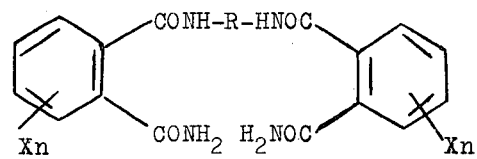

wherein X, $n$ and R are as defined above, is subjected to intramolecular dehydrocondensation.

8 Claims, 1 Drawing Figure

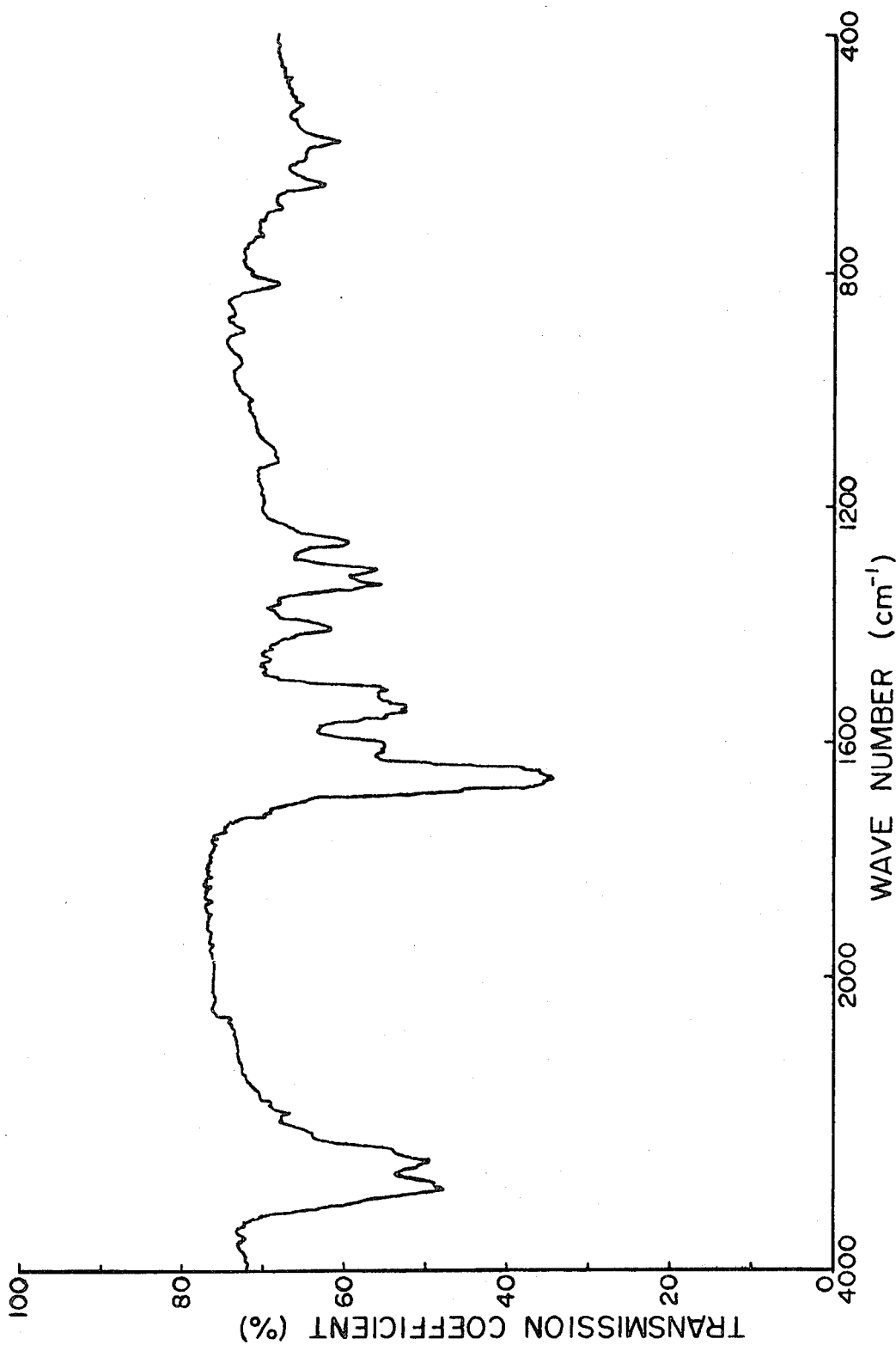

METHOD FOR PREPARING ISOINDOLENONE PIGMENTS

This invention relates to a method for preparing isoindolenone pigments.

Conventional methods for preparing isoindolenone pigments include a method (Swiss Pat. Nos. 346,218, 348,496 and 363,980) in which an isoindoline having three or more halogen atoms on the aromatic nucleus is reacted with a poly-primary amino compound, being represented, for example, by the reaction formulas;

(1) 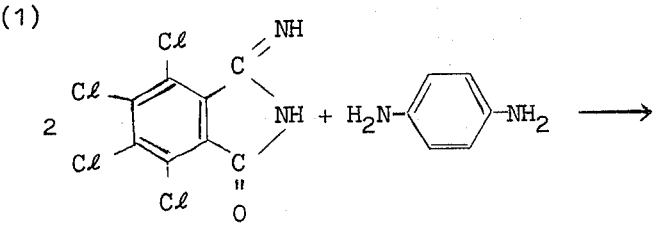

(2) 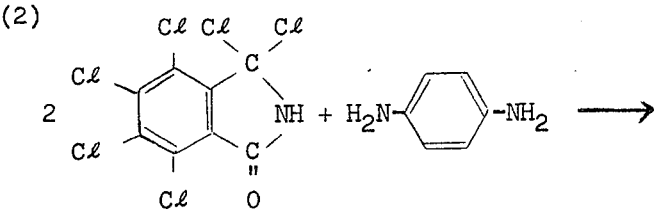

(3) 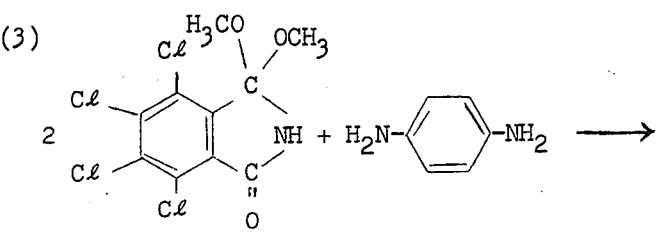

in order to obtain the pigments of the formula;

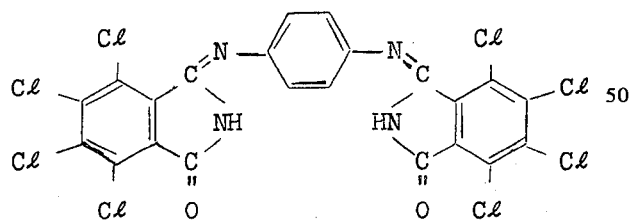

and a method (U.S. Pat. No. 2,537,352) in which an isoindoline-1-one having no substituent or having two substituents on the aromatic nucleus is reacted with a divalent aromatic diamine. Practical operation based on these methods, however, involves many problems. For example, preparation of isoindoline-1-one faces many limitations; halophthalimides or o-cyano benzoic acid esters which serve as raw materials are not easily available, and where a halophthalimide is used as a raw material, an intermediate of high purity is difficult to obtain in a high yield. Furthermore, when conducting the reaction of isoindoline-1-one with diamine, the above-mentioned reactions (1) and (3) require the use of troublesome glacial acetic acid as a reaction medium, and the reaction (2) allows rapid condensation reaction making it hard to control the reaction.

The object of this invention, therefore, is to overcome such drawbacks inherent in the conventional methods and to provide a new method which allows easy progressing of the reaction contributing to the formation of isoindolenone pigments in high yield and high purity and cheaply as well.

Other objects of this invention will become clear as the description proceeds.

The inventors of this application have found that by heating the compounds represented by the general formula

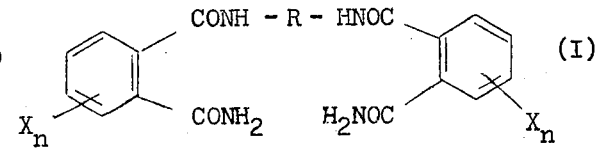 (I)

in which X is a halogen atom, $n$ is 0 or an integer of 1–4, and R is a direct bond, divalent aromatic residue or divalent hetercoyclic residue, together with phosphorus pentachloride or phosphorus pentabromide as a condensing agent (dehydrating agent) in an inert organic solvent for the purpose of causing intramolecular dehydrocondensation, the isoindolenone pigments of the general formula

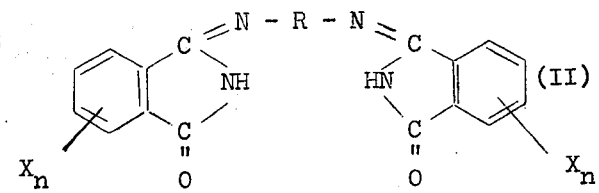 (II)

in which X, n R are as defined above, are obtained in high yields and high purity, thereby satisfying the above-mentioned object of this invention.

As the inert organic solvent mentioned above, there may be used preferably benzene, toluene, xylene, monochlorobenzene, o-dichlorobenzene, trichlorobenzene, dichloroethane, trichloroethane, tetrachloroethane, nitrobenzene, decalin, diphenyl ether, etc. The amount of the condensing agent should be more than 2 mole ratio, and preferably 3 – 4 mole ratio. The heating requires a temperature of above 60°C. But a temperature exceeding 130°C is not desired as the product gets foul and reduces the value of pigment. Optimal heating temperature ranges 70° to 80°C. The reaction completes in about 0.5 to 4 hours, being very simple, and imposes no problem for industrialization.

The compound of the formula (I) used as a raw material for making isoindolenone pigments of this invention can be obtained very easily by condensing a phthalic anhydride or a halophthalic anhydride having 1 – 4 halogen atoms on the aromatic nucleus, with hydrazine, an aromatic diamine, or a heterocyclic diamine, in an inert organic solvent by using a condensing agent such as phosphorus pentachloride, phosphorus trichloride, thionyl chloride, acetyl chloride, phosphorus oxybromide, or acetyl bromide, and then adding ammonia water to the reaction mixture or directly blowing ammonia gas to the reaction mixture. As inert organic solvents, those used for causing intramolecular dehydrocondensation reaction can be used preferably.

As examples of the halophthalic anhydride having 1 – 4 halogen atoms on the aromatic nucleus which is used as one of the raw materials for making the compound of the formula (I), there may be cited 3-chlorophthalic anhydride, 4-chlorophthalic anhydride, 3,4-dichlorophthalic anhydride, 3,5-dichlorophthalic anhydride, 3,6-dichlorophthalic anhydride, 4,5-dichlorophthalic anhydride, 3,4,5-trichlorophthalic anhydride, 3,4,6-trichlorophthalic anhydride, 3,4,5,6-tetrachlorophthalic anhydirde, 3-bromophthalic anhydride, 4-bromophthalic anhydride, 3,4-dibromophthalic anhydride, 3,5-dibromophthalic anhydride, 3,6-dibromophthalic anhydride, 4,5-dibromophthalic anhydride, 3,4,5-tribromophthalic anhydride, 3,4,6-tribromophthalic anhydride, 3,4,5,6-tetrabromophthalic anhydride, 3-fluorophthalic anhydride, 4-fluorophthalic anhydride, 3,4-difluorophthalic anhydride, 3,5-difluorophthalic anhydride, 3,6-difluorophthalic anhydride, 4,5-difluorophthalic anhydride, 3,4,5-trifluorophthalic anhydride, 3,4,6-trifluorophthalic anhydride, and 3,4,5,6-tetrafluorophthalic anhydride.

As the aromatic diamine or heterocyclic diamine used as another raw material for making the compound of the formula (I), diamines used so far as a raw material for making isoindolenone pigments can be used. As examples of such diamines, there may be cited o-, m-, p-phenylenediamines, benzidine, o-dianisidine, o-, m-tolidines, 3,3'-dichlorobenzidine, 4,4'-diaminodiphenyl methane, 3,3'-dichloro-4,4'-diaminodiphenyl methane, 4,4'-diaminodiphenyl ether, 1,5-diaminonaphthalene, 2,2'-diaminodiphenyl, 2,6-diaminotoluene, 2,6-diaminopyridine, and 2,6-diaminobenzothiazole.

The process of preparing the compounds of the formula (I) is exemplified below as Reference Example.

REFERENCE EXAMPLE:

54 Grams of p-phenylenediamine was dissolved in 900 ml of dimethylformamide with stirring at room temperature, and to the so obtained solution was added 300 g of tetrachlorophthalic anhydride maintaining a temperature below 30°C. The resulting solution was then stirred for one hour and was admixed with 44 ml of phosphorus trichloride dropwise. The mixture was then stirred at the same temperature for 2 hours. By slowly adding 180.5 ml of 28% by weight of ammonia water to the reaction mixture in which has been suspended a precipitated condensate, and stirring the mixture at 30°C for 4 hours, a white crystalline substance was precipitated. The mixture was poured into 1 liter of ice water and was filtered. The white residue was again suspended in 2 l of water and was stirred for one hour at 90°C, followed by hot filtration, and then dried sufficiently. The yield was 329 g. The drawing attached shows the infrared ray absorption spectrum of the product. From the drawing, it was confirmed that the product is a compound which can be represented by the structural formula

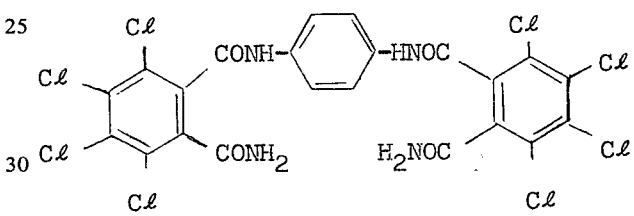

The invention is illustrated below with reference to Examples, and parts are all by weight unless otherwise specified.

EXAMPLE 1:

13.6 Parts of the compound represented by the structural formula

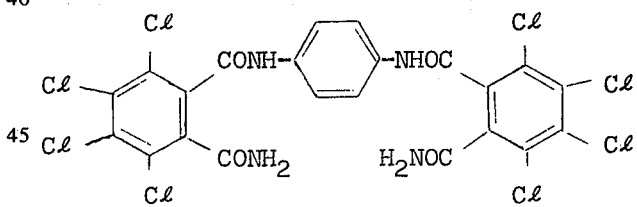

and 12.5 parts of phosphorus pentachloride were stirred in 100 parts of trichlorobenzene at a temperature of 70° – 80°C for 3 hours, cooled and filtered. The residue was washed sufficiently with methanol and then with water, and dried. 10.7 Parts of a reddish yellow compound was obtained. By comparing the so obtained compound with the known compound by means of infrared ray absorption spectrum, it was confirmed that the compound is a pigment represented by the structural formula

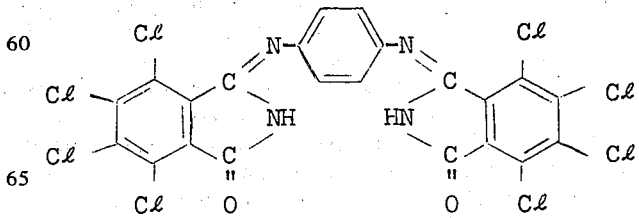

A paint prepared by kneading the so obtained pigment together with a melamine alkyd resin was sprayed on a tin plate and baked at a temperature of 120°C. For bleed testing, a titanium white/melamine alkyd paint was sprayed onto the coated surfaces of a tin plate, and baked at temperatures of 140°C and 160°C. In both cases, no bleeding occurred.

Also, a paint prepared by kneading the pigment and melamine alkyd resin together with titanium white in an amount ten times that of the pigment, was sprayed onto the tin plate and baked at a temperature of 120°C. The sample was tested for weatherability, and a very good result was obtained.

EXAMPLE 2:

15.0 Parts of the compound represented by the structural formula

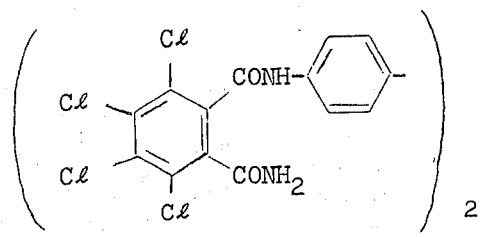

and 25.8 parts of phosphorus pentabromide were refluxed in 150 parts of benzene, and heated and stirred for 3 hours. After cooling, the mixture was admixed with 10 parts of pyridine, and filtered and washed sufficiently with benzene, methanol and hot water in the order mentioned. The resulting substance was then dried, and 10.0 parts of a compound of orange color was obtained. Comparison with the known compound by means of infrared ray absorption spectrum has proved that the compound so obtained is a pigment which can be represented by the structural formula

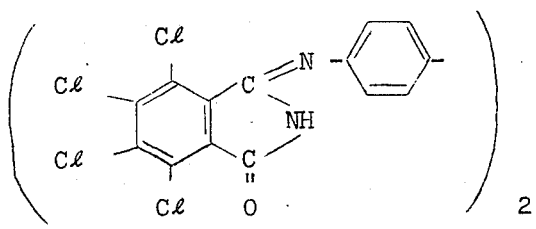

By kneading the pigment with vinyl chloride resin by means of a heated roll, a clear orange vinyl chloride resin sheet was obtained. The pigment showed itself to be very good in heat resistance, migration resistance, and whetherability.

EXAMPLE 3:

Process of Example 1 was repeated by using 13.9 parts of the compound represented by the structural formula

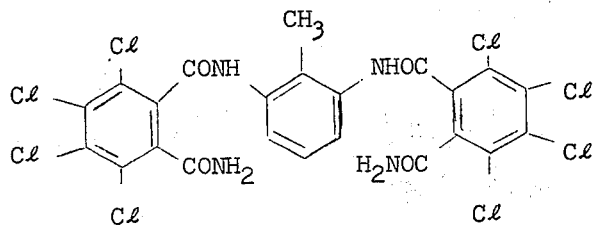

and 11.2 parts of a bluish yellow compound was obtained. Comparison with the known compound by means of infrared ray absorption spectrum proved that the compound is a pigment which can be represented by the structural formula

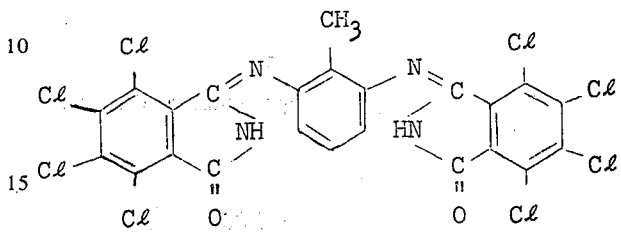

EXAMPLE 4:

15.6 Parts of the compound represented by the structural formula

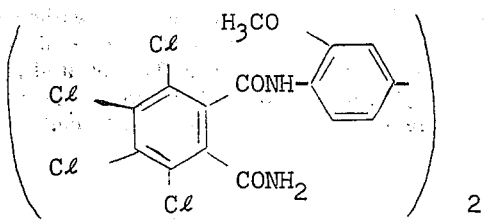

and 12.5 parts of phosphorus pentachloride were heated at 70°–80°C and stirred for 3 hours in 150 parts of toluene. After cooling, the mixture was admixed with 10 parts of pyridine, and filtered, and then washed sufficiently with toluene, methanol, and hot water in the order mentioned, and dried. 10.2 Parts of a reddish compound was obtained. Comparison with the known compound by means of infrared ray absorption spectrum has proved the compound so obtained to be a pigment which can be represented by the structural formula

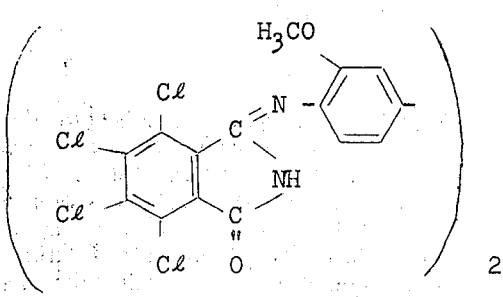

Also, paints prepared by kneading the pigments of Examples 1 – 4 and melamine alkyd resin together with titanium white in an amount 20 times that of the pigment were coated on the tin plates, and exposed outdoors for two years. Results were as shown in Table 1 below.

Table 1

|  | Example 1 | Example 2 | Example 3 | Example 4 |
|---|---|---|---|---|
| Color tone of pigment | reddish yellow | orange | bluish yellow | red |
| Color difference (ΔE) | 0.92 | 2.12 | 3.45 | 4.82 |

EXAMPLE 5:

8.0 Parts of the compound represented by the structural formula

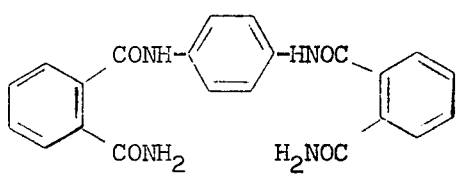

and 8.4 parts of phosphorus pentachloride were heated at 60°C and stirred for one hour in 80 parts of trichlorobenzene, and blown with ammonia gas, neutralized, cooled, and filtered. The residue was washed sufficiently with ethanol and then water, and dried. A clear yellow compound was obtained. The infrared ray absorption spectrum has proved the compound to be a pigment represented by the structural formula

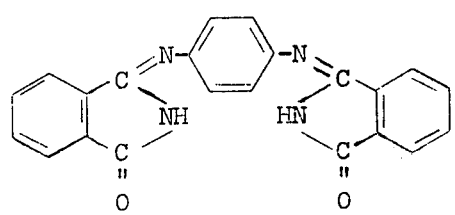

EXAMPLE 6:

13.6 Parts of the compound represented by the structural formula

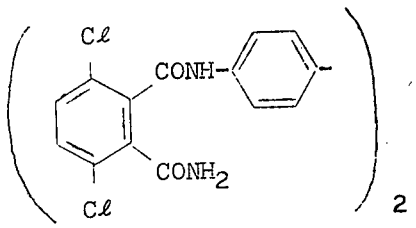

and 10.5 parts of phosphorus pentachloride were heated at 70°– 80°C for 4 hours in 120 parts of decalin, and admixed with 3.8 parts of formamide, cooled and filtered. The residue was washed sufficiently with methanol and then with hot water. A clear orange compound was obtained. The infrared ray spectrum has proved the compound to be a pigment which can be represented by the structural formula

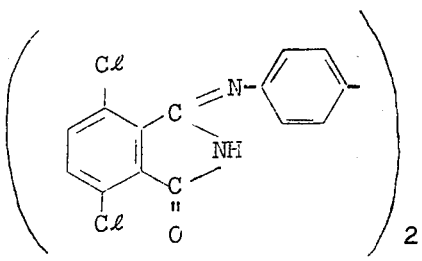

EXAMPLE 7:

10.8 Parts of the compound represented by the structural formula

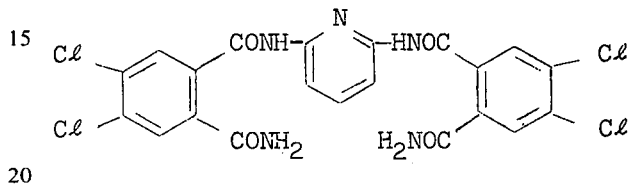

and 34.4 parts of phosphorus pentabromide were stirred at 120°C for 30 minute in 100 parts of dichloroethane, neutralized with ammonia gas, cooled and filtered. The residue was washed with methanol and then with hot water. A bluish yellow compound was obtained. The infrared ray absorption spectrum has proved the compound to be a pigment of the structural formula

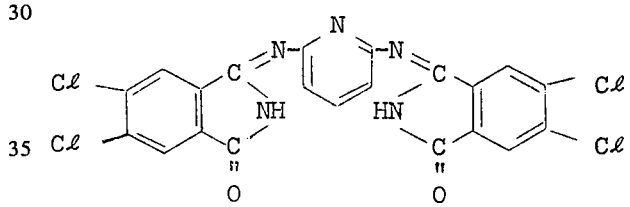

EXAMPLE 8:

20.7 Parts of the compound represented by the structural formula

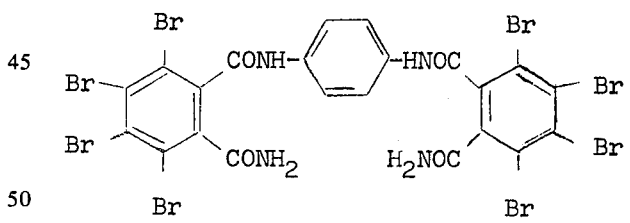

and 12.5 parts of phosphorus pentachloride were stirred at 70° – 80°C for 4 hours in 150 parts of trichlorobenzene, added with 10 parts of anhydrous sodium acetate, and filtered maintaining a temperature of 50°–60°C. The residue was washed sufficiently with methanol and then with hot water, and dried. A clear yellowish compound was obtained. The infrared ray absorption spectrum has proved the compound to be a pigment of the structural formula

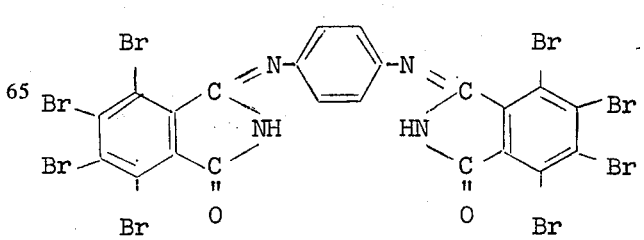

EXAMPLE 9:

13.0 Parts of the compound represented by the structural formula

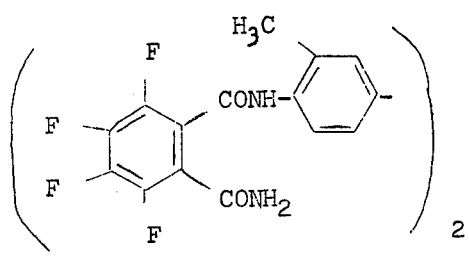

and 12.5 parts of phosphorus pentachloride were stirred at 100°C for 1.5 hours in 150 parts of xylene, cooled and filtered. Then the residue was washed sufficiently with xylene, methanol, and hot water in the order mentioned. A yellowish compound was obtained. The infrared ray absorption spectrum has proved the compound to be a pigment which can be represented by the structural formula

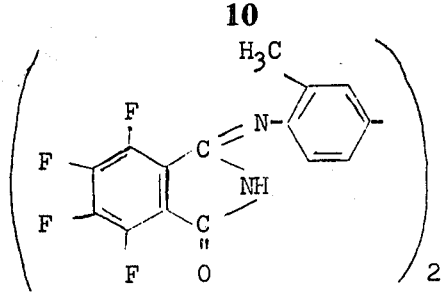

EXAMPLE 10:

A variety of compounds represented by the formula (I) were used as starting materials and treated in the same manner as in the above-mentioned Examples to obtain a variety of isoindolenones. In Table 2, below, col. 1 shows

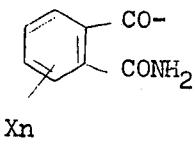

component of formula (I), col. 2 shows —NH—R—HN— component of formula (I), and col. 3 shows the color tone of the pigment obtained.

Table 2

| Component of formula (I) | —NH—R—HN— | Color tone of pigment obtained |
|---|---|---|
| ![Xn structure with CO- and CONH2] | | |
| ![Cl4 benzene with CO- and CONH2] | —NH—HN— | bluish yellow |
| " | ![m-phenylene -NH HN-] | " |
| " | ![3,3'-dimethylbiphenyl -NH HN-] | red |
| " | ![-NH-C6H4-CH2-C6H4-HN-] | bluish yellow |
| " | ![-NH-C6H4-O-C6H4-HN-] | yellow |
| " | ![-NH-C6H4-NHCO-C6H4-HN-] | reddish yellow |

Table 2-continued
| Component of formula (I) | —NH—R—HN— | Color tone of pigment obtained |
|---|---|---|
| 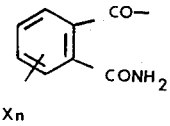 | 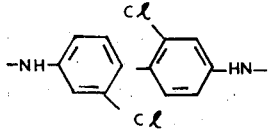 | yellow |
| 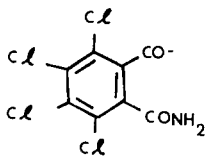 | 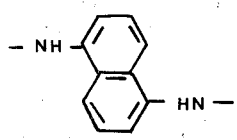 | yellowish orange |
| " | 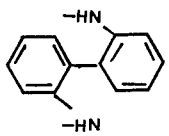 | orange |
| " | 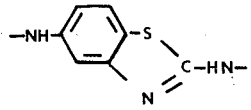 | bluish yellow |
| " | 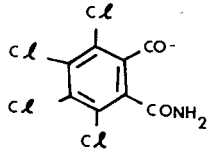 | yellow |
| 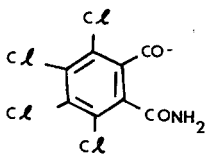 | —NH—⟨  ⟩—HN— | reddish yellow |
| 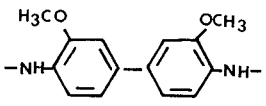 | —NH—⟨  ⟩—HN— | reddish yellow |
| 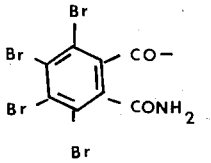 | | yellow |
| | | red |

What is claimed is:
1. A method of preparing an isoindolenone pigment of the formula

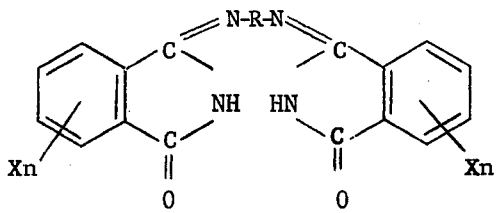

wherein X is a halogen atom, n is a number from 0 to 4, and R is a direct bond, or divalent residue of one of the group consisting of o-, m-, p-phenylenediamines, benzidine, o-dianisidine, o-, m-tolidines, 3,3'-dichlorobenzidine, 4,4'-diaminodiphenyl methane, 3,3'-dichloro-4,4'-diaminodiphenyl methane, 4,4'-diaminodiphenyl ether, 1,5-diaminonaphthalene, 2,2'-diaminodiphenyl, 2,6-diaminotoluene, 2,6-diaminopyridine, 2,6-diaminobenzothiazole, diaminoazobenzene, N-(p'-aminophenyl)p-aminobenzamide, or 2,2'-dichlorobenzidine; comprising the step of condensing a compound of the formula

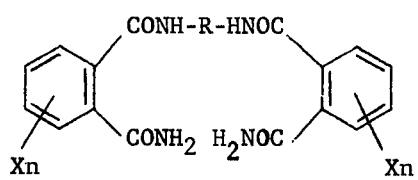

wherein X, n, and R are as defined above, at a temperature of from 60° to 130°C. and in the presence of both an inert organic solvent and at least 2 mols per mol of the above compound of a condensing agent.

2. A method according to claim 1, wherein the heating is performed at a temperature ranging 70° to 80°C.

3. A method according to claim 1, wherein benzene, toluene, xylene, chlorobenzenes, chloroethanes, nitrobenzene, decalin, or diphenylether is used as the inert organic solvent.

4. A method according to claim 1 wherein the condensing agent is present in from 3 to 4 mols per mol of the compound.

5. A method according to claim 1 wherein the condensation reaction takes from 0.5 to 4 hours.

6. A method according to claim 1 wherein the condensing agent is phosphorous pentachloride or phosphorous pentabromide.

7. A method according to claim 1 wherein X is chlorine or bromine.

8. A method according to claim 1 wherein R is the residue of one of the group comprising p-phenylenediamine, 2,6-diaminotoluene, benzidine, 2,2'-diaminodiphenyl, o-dianisidine, or diaminoazobenzene.

* * * * *

UNITED STATES PATENT OFFICE
CERTIFICATE OF CORRECTION

Patent No. 3,923,773           Dated December 2, 1975

Inventor(s)  ANDO, ET AL.

It is certified that error appears in the above-identified patent and that said Letters Patent are hereby corrected as shown below:

Item 54, line 2, delete "ISOINDOLENONE", insert -- ISOINDOLINONE --

Column 10, line 16, delete "isoindolenones", insert
        -- isoindolinones --

Delete "isoindolenone" and insert -- isoindolinone -- in the
    following instances:

Item 57, line 2;
    Column 1, line 5;
    Column 1, line 6;
    Column 2, line 8;
    Column 2, line 62;
    Column 3, line 18;
    Column 3, line 55; and
    Claim 1, line 1.

Signed and Sealed this thirtieth Day of March 1976

[SEAL]

Attest:

RUTH C. MASON
Attesting Officer

C. MARSHALL DANN
Commissioner of Patents and Trademarks